United States Patent [19]
Goss et al.

[11] 3,796,470
[45] Mar. 12, 1974

[54] IMPROVEMENTS IN OR RELATING TO BRAKE CONTROL APPARATUS

[75] Inventors: Alan P. Goss, Carterton; Brian Shepherd; David A. Williams, both of Witney, all of England

[73] Assignee: Smiths Industries Limited, London, England

[22] Filed: June 18, 1971

[21] Appl. No.: 154,639

Related U.S. Application Data
[63] Continuation of Ser. No. 845,319, July 28, 1969, abandoned.

[30] Foreign Application Priority Data
July 29, 1968  Great Britain .................... 36096/68

[52] U.S. Cl. ..................... 303/21 CG, 188/181 A
[51] Int. Cl. .................................................... B60t 8/12
[58] Field of Search ............ 188/181 A; 303/20, 21; 324/162; 340/52 R, 262

[56] References Cited
UNITED STATES PATENTS
3,622,973  11/1971  Domann et al. ........... 303/21 GG X
3,184,606  5/1965   Ovenden et al. ......... 303/21 CF UX
3,614,174  10/1971  Romero ......................... 303/21 CG
3,604,762  9/1971   Ando et al. .................... 303/21 BE
3,589,776  6/1971   Wehde ........................... 303/21 CG FOREIGN PATENTS OR APPLICATIONS
1,811,192  8/1970  Germany ..................... 303/21 CF Primary Examiner—George E. A. Halvosa
Assistant Examiner—Stephen G. Kunin
Attorney, Agent, or Firm—George Vande Sande

[57] ABSTRACT

A brake control system in which electrical signals proportional to the speed of a braked wheel are compared with output signals derived from the electrical signals. The output signals are arranged to be in one phase relationship for normal braking and in another phase relationship whenever the braked wheel is about to lock. The phase relationship is changed by adjustment of the output signals, independently of the electrical signals, if the rate of change of the electrical signal exceeds a predetermined rate. The change of pulse relationship is sensed to initiate a brake release signal for preventing wheel-lock during braking.

14 Claims, 5 Drawing Figures

A. P. GOSS
B. SHEPHERD
D. A. WILLIAMS

A. P. GOSS
B. SHEPHERD
D. A. WILLIAMS by Hall, Pollock & Vande Sande

IMPROVEMENTS IN OR RELATING TO BRAKE CONTROL APPARATUS

This application is a continuation of our co-pending application Ser. No. 845,319, filed July 28, 1969, and now abandoned.

The invention relates to brake control apparatus for a vehicle.

The invention provides apparatus for eliminating or at least reducing the occurrence of the wheels of a vehicle locking when the brakes of a vehicle are applied.

According to the invention there is provided brake control apparatus for a vehicle comprising, a generator for producing an electrical signal at a frequency which is proportional to the angular velocity of a braked wheel of a vehicle; circuit means arranged to respond to the electrical signal to produce an output signal having a frequency dependent upon the frequency of the electrical signal, including auxiliary circuit means arranged to adjust said output signal whenever a rate of change, in a sense indicating deceleration of the vehicle, of the frequency of the electrical signal exceeds a predetermined rate; and means sensitive to the condition that the output signal is being adjusted by the auxiliary circuit means to produce a brake release signal.

The electrical signal may be arranged to be in the form of square-wave pulses.

The circuit means may be arranged to be triggered by leading edges of the electrical signal and produce said output signal in the form of square-wave pulses, the circuit means including means for monitoring the frequency of said electrical signal and controlling the width of the output signal pulses in accordance therewith. In such an arrangement, the auxiliary circuit means may be arranged to adjust the width of said output signal pulses independently of the frequency of the electrical signal whenever the rate of change of the frequency of said electrical signal exceeds the predetermined rate.

The generator may be driven by the braked wheel of the vehicle. In the case of a vehicle having a transmission, the generator may be driven by a drive shaft of the braked wheel, or by any other part of the vehicle which is arranged to move at a rate proportional to the rate of rotation of the braked wheel or braked wheels of the vehicle.

The auxiliary circuit means may include means for adjusting the predetermined rate of change of the frequency of the electrical signal at which the output signal is adjusted by the auxiliary circuit means. The means of adjusting may be operable manually to a setting suitable for particular working conditions of the vehicle, for example the load carried by the vehicle. Alternatively, or in addition, this adjustment may be made automatically in accordance with the actual rate of change of the speed of the vehicle. The actual rate of change can be sensed for example by an accelerometer, or by sensing rate of change of rotation of an unbraked wheel of the vehicle.

The auxiliary circuit means may comprise an electrical circuit arranged to limit the rate of changing or discharging, as the case may be, of capacitor means whenever the electrical signal changes, in a vehicle decelerating sense, at a rate in excess of said predetermined rate. In this arrangement the potential across said capacitor means is used to control the width of said output signal pulses.

The means sensitive to the condition that the output signal is being limited may comprise a comparator arranged to receive and compare the relationship between the electrical signal and the output signal. The comparator may be a phase comparator. In embodiments in which the electrical signal is in the form of square-wave pulses, the comparator is conveniently arranged to be sensitive to changes of time-sequence between the occurrence of leading and/or trailing edges of the electrical signal and the output signal.

Brake control apparatus in accordance with this invention will now be described, by way of example only, with reference to the accompanying drawings, of which:

The brake control apparatus is designed to act on the braking system of a road vehicle and is intended to prevent wheel-lock when the brakes are applied by the vehicle driver to the wheels of the vehicle irrespective of the force applied to the braking system by the driver of the vehicle.

Figure 1:
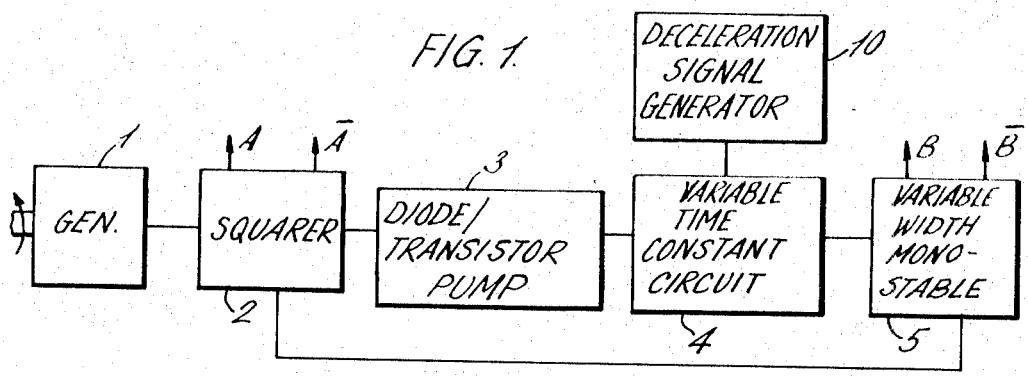
FIG. 1 is a block diagram of part of the brake control apparatus.
Figure 3:
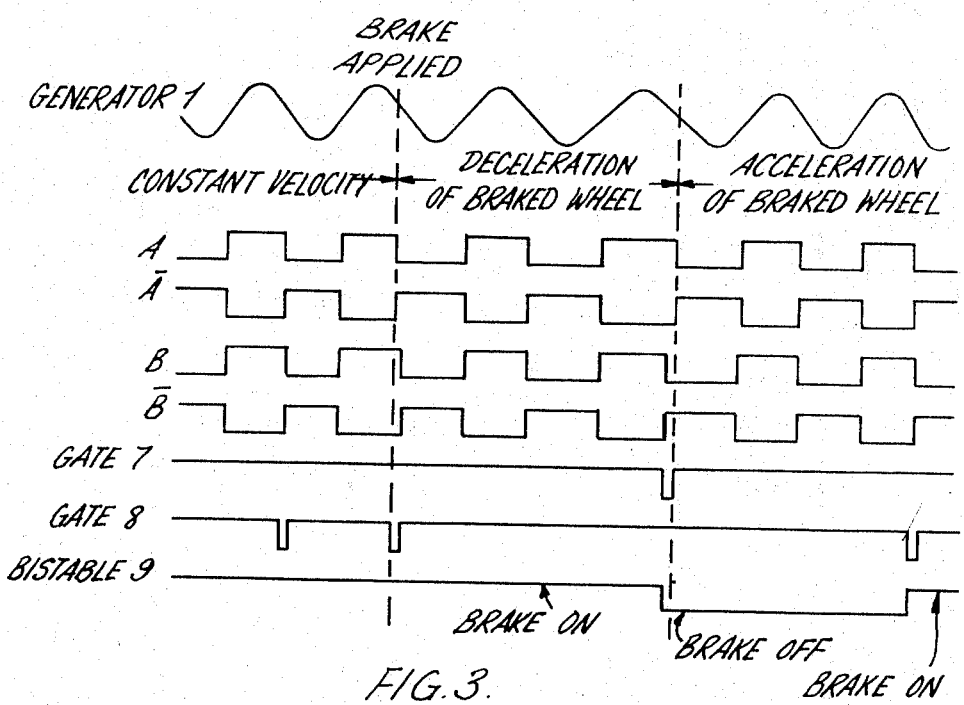
FIG. 3 shows waveforms of signals appearing at various points in the brake control apparatus.

Referring to FIG. 1, an electrical signal generator 1 is driven by a braked wheel of the vehicle and produces an output wave-form, illustrated in FIG. 3, which is in the form of an a.c. signal the frequency of which is proportional to the angular velocity of the wheel driving the generator 1. The output signal of the generator 1 is fed to a squarer 2 which squares the signal fed to it and produces complementary output waveforms A and $\bar{A}$ which are illustrated in FIG. 3. The signal A is fed to a diode/transistor pump 3 which produces an output d.c. signal the amplitude of which is proportional to the frequency of the output of the generator 1 and which responds rapidly to changes of frequency of the signal fed to it. The output signal of the diode/transistor pump 3 is fed to a circuit 4 which includes a capacitor which is discharged in dependence upon the output signal of the diode/transistor pump 3. This capacitor is connected in series with a circuit which limits the rate at which the potential across the capacitor can change during deceleration of the vehicle so that the potential across this capacitor, which is the output signal of the circuit 4, varies in sympathy with that of the diode/transistor pump 3, except when the vehicle is decelerating at above a predetermined rate, at which times the output signal of the circuit 4 lags that of the circuit 3.

The output A of the squarer 2 is also fed to a variable width monostable 5 which is triggered by the leading edge of each pulse in the output A. The output signal of the circuit 4 is also fed to the variable width monostable 5 and controls the width of its output pulses, the arrangement being that the width of the output pulse of the monostable 5 decreases as the vehicle speed, as represented by the output signal of the circuit 4, increases. The width of the pulses in the output A decreases as the frequency of the output signal of the generator 1 increases, that is to say, as the speed of the vehicle increases, and it is arranged that the trailing edge of each pulse of the output A normally occurs before the corresponding trailing edge of the output B of the monostable 5. The monostable 5 has two complementary outputs B and $\bar{B}$ which are illustrated in FIG. 3, and these output signals are fed to the part of the apparatus illustrated in block diagram form in FIG. 2 together with the outputs A and $\bar{A}$. This part of the apparatus is a gating or comparator arrangement which detects when the trailing edge of a pulse of output B occurs before the trailing edge of the corresponding pulse in output A.

Under constant speed conditions the position of the trailing edge of the pulses of output B will remain at a fixed proportion (dependent on the speed) of one cycle relative to and after the corresponding trailing edges of the pulses of output A. Assuming now that the brakes have been applied, the output signal of the generator 1 changes but the maximum rate at which the output signal of the circuit 4 can change is limited and consequently the maximum rate at which the intervals between the leading and trailing edges of the pulses in waveform B can increase is also limited. This maximum rate is set to correspond to the maximum deceleration expected to be achieved by the vehicle. If however the braked wheel locks (i.e., the braked wheel is subjected to an angular deceleration in excess of the deceleration corresponding to the expected maximum deceleration of the vehicle), there is a rapid change to the condition in which the trailing edges of the pulses of output A will occur later than the trailing edges of the corresponding pulses of output B. The gating or comparator arrangement detects this condition and through an output power switch 6 causes the brakes to be released. The wheels of the vehicle will then accelerate to a speed at which the trailing edges of the pulses of output A precede the trailing edges of the corresponding pulses of output B whereupon the power switch 6 reverts to its original condition and the brakes are reapplied.

Figure 2:
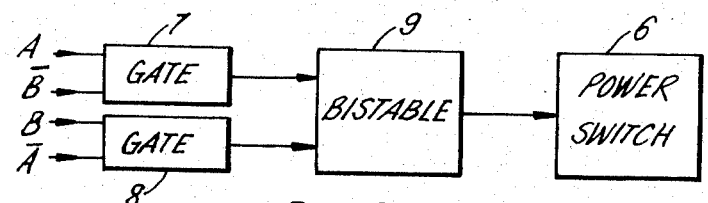
FIG. 2 is a block diagram of another part of the brake control apparatus.

Referring now to FIG. 2 the gating or comparator arrangement comprises two two-input "AND" gates 7 and 8. The gate 7 is fed with the output A and $\bar{B}$ while the gate 8 is fed with outputs B and $\bar{A}$ and both gates 7 and 8 are arranged to produce an output signal only when the potential of both of their respective input signals are at their upper level. Referring to FIG. 3 it will be seen that gate 7 will only produce an output signal when the trailing edge of a pulse of the output A is preceded by the trailing edge of the corresponding pulse output B (the leading edge of $\bar{B}$). Similarly gate 8 will only produce an output when the trailing edge of a pulse in output B is preceded by the trailing edge of the corresponding pulse in output A (the leading edge of $\bar{A}$).

The outputs of gates 7 and 8 are fed to a bistable 9 which controls the power switch 6 and it is arranged that each pulse in the output of the gate 7 triggers the bistable 9 to the state in which the power switch causes the brakes to be released. Each pulse in the output of the gate 8 causes the bistable 9 to revert to its other state in which the power switch 6 does not interfere with the operation of the brakes.

It will thus be seen that whenever the wheels tend to lock the brakes are released until the braked wheel driving the generator 1 has accelerated to the speed at which the trailing edges of the pulses of output A precede the trailng edges of the corresponding pulses of output B.

Figure 4:
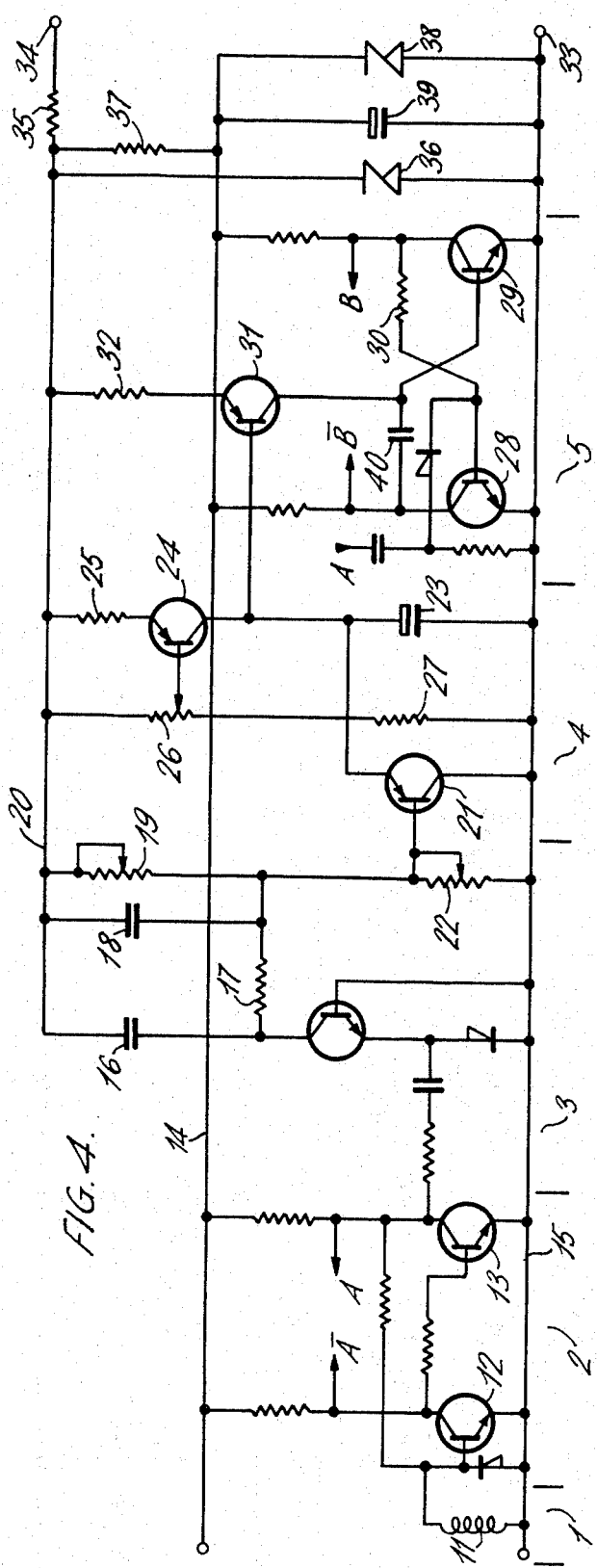
FIG. 4 is a circuit diagram of the part of the brake control apparatus shown in FIG. 1.

Referring now to FIG. 4 the generator 1 is illustrated by a winding 11 and may be of conventional construction. The squarer 2 has two amplifying stages employing n-p-n transistors 12 and 13 respectively, which are connected in cascade, positive feedback being applied from the collector of transistor 13 to the base of transistor 12 so as to give the squared signal greater sharpness. The output A and $\bar{A}$ are taken from the collectors of transistors 13 and 12 respectively. The squarer 2 is connected between a stabilised positive supply line 14 and a zero volts line 15 so that the amplitude of its output signal is stabilised. Output A is fed to the diode/transistor pump 3 which has a generally conventional configuration and includes a capacitor 16 the potential across which is proportional to the frequency of the output A. The capacitor 16 has a relatively low value so that the signal across it changes rapidly when the frequency of the signal induced in the winding 11 changes. The capacitor 16 is shunted by a resistor 17 and a capacitor 18 in series, the function of the components 17 and 18 being to smooth out any ripple appearing across the capacitor 18 as a result of its small valve. The diode/transistor pump 3 also comprises a variable resistor 19 connected across the capacitor 18 and through which the capacitors 18 and 16 discharge, the potential across the parallel circuit of the capacitor 18 and the variable resistor 19 being the output signal of the diode/transistor pump 3. The diode/transistor pump 3 is connected between a positive supply line 20 and the line 15, the capacitor 18 having one of its electrodes connected to the line 20 so that the potential of its other electrode becomes less positive as the frequency of the signal induced in the winding 11 increases i.e., as the vehicle accelerates. The circuit 4 has a p-n-p transistor 21 the base of which is connected to the electrode of the capacitor 18 remote from the line 20 and also, through a variable resistor 22, to the line 15. The collector of the transistor 21 is connected to the line 15 and its emitter is connected to the line 15 through a capacitor 23 and also to the collector of a p-n-p transistor 24. The emitter of the transistor 24 is connected to the line 20 through a resistor 25; a potentiometric resistor 26 in series with a resistor 27 is connected between the lines 20 and 15, the wiper of the potentiometric resistor 26 being connected to the base of the transistor 24.

The potential of the base of the transistor 21 (i.e., the output potential of the diode/transistor pump 3) controls the potential across the capacitor 23 which, when the potential at the base of the transistor 21 becomes more positive, charges up through the transistor 24 and the resistor 25 and, when the potential at the base of the transistor 21 becomes less positive, discharges through the transistor 21. The transistor 24 acts as a constant current source, the magnitude of which is controlled by the setting of the potentiometric resistor 26 so as to set maximum rate at which the capacitors 23 can charge. Thus, when the potential at the base of the resistor 21 is rising due to deceleration of the wheel driving the generator 1, the rate at which the potential across the capacitor 23 rises is limited by the setting of the transistor 26. However there is no limitation on the rate at which the potential across the capacitor 23 falls when the potential at the base of the transistor 21 falls due to acceleration of the wheel driving the generator 1.

It will be seen from the earlier description of the circuit 4 that the potentiometer 26 is set to correspond to the maximum deceleration normally expected of the vehicle.

The monostable 5 has two n-p-n transistors 28 and 29 which are connected between the lines 14 and 15. The base of the transistor 28 is connected to the collector of the transistor 29 through a resistor 30; the base of the transistor 29 is connected to the collector of the transistor 28 through a capacitor 40 and to the line 20 through the collector-emitter path of a p-n-p transistor 31 in series with a resistor 32, the capacitor 40 being arranged to charge with a constant current through the transistor 31 and the resistor 32. The electrode of the capacitor 23 connected to the collector of the transistor 24 is also connected to the base of the transistor 31 so that the output potential of the circuit 4 controls the period of the monostable 5. The output A is fed to the base of the transistor 28 through a conventional differentiating circuit included in the monostable 5.

It has so far been assumed that the maximum rate at which the output potential of the circuit 4 can change during deceleration is fixed i.e., the setting of the potentiometric resistor 26, while adjustable, is not changed in normal use.

However, to achieve an optimum setting for resistor 26 under all road conditions, the effective bias for transistor 24, provided by the potentiometric resistor 26, can be varied in accordance with the vehicle acceleration or deceleration for example by connecting the wiper of potentiometric resistor 26 to a spring-biased weight or some other form of accelerometer.

Alternatively, to achieve an optimum setting for the effective bias for transistor 24 under all road conditions, the deceleration of the vehicle could be sensed by monitoring the rate of rotation of an unbraked wheel of the vehicle. Under these circumstances the apparatus as a whole would detect the condition of ship, in which the angular deceleration of the brake wheel driving the tachogenerator 1 is greater than that represented by the unbraked wheel and corresponding to the linear deceleration of the vehicle. The apparatus can be set so that the brakes are released when this slip exceeds a certain percentage (e.g., 15 percent). This arrangement is schematically indicated in FIG. 1 by the additional unit 10 which, in response to the monitored rotation of the unbraked wheel, provides a vehicle deceleration signal to the circuit 4 that modifies that circuit's time constant by varying the bias voltage of transistor 24.

Figure 5:
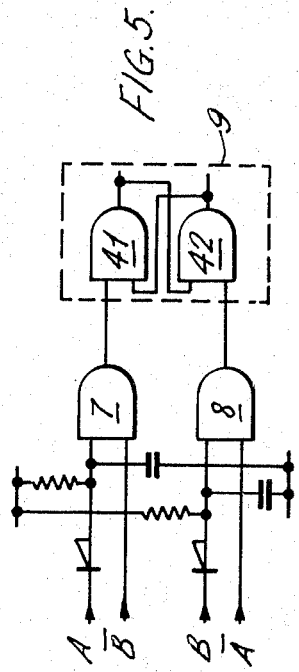
FIG. 5 is a more detailed block diagram of the part of the brake control apparatus shown in FIG. 2.

Referring now to FIG. 5 the outputs A, $\bar{A}$, B and $\bar{B}$ are fed to the gates 7 and 8 through conventional pulse shaping circuits. The bistable 9 is constituted by two two-input "AND" gates 41 and 42 so connected so that they act as a bistable.

Referring again to FIG. 4, the line 15 is connected to a terminal 33 intended to be connected to the negative terminal of the vehicle battery whereas the line 20 is intended to be connected to the positive terminal 34 of the vehicle battery through a resistor 35; the line 20 is connected to the line 15 through a Zener diode 36. The resistor 35 and the Zener diode 36 give voltage stabilisation to the line 20. The line 20 is connected to the line 14 through a resistor 37 and the line 14 is connected to the line 15 through a Zener diode 38 and a capacitor 39 in parallel, the resistor 37, the Zener diode 38 and the capacitor 39 providing additional voltage stabilisation for the line 14. Zener diodes 36 and 38 are so chosen that the lines 14 and 20 are at potentials of + 5 volts and + 9 volts respectively with respect to the line 15.

What is claimed is:

1. A brake control apparatus for the braked wheel of a vehicle, comprising:
    a generator coupled to the wheel for producing a first signal at a frequency which is directly proportional to the angular velocity of the wheel;
    means responsive to said first signal to produce a second signal of pulses having a pulse-width dependent upon the frequency of said first signal including means to limit in a predetermined manner the degree of dependency of the width of said second pulses upon the frequency of said first signal when the rate of change of frequency of said first signal exceeds a defined deceleration limit;
    and auxiliary means responsive to change in the pulse width of said second signal to effect braking relief of said wheel when said change is representative of a deceleration in excess of said defined deceleration limit.

2. A brake control apparatus according to claim 1, in which said generator comprises means to produce said first signal in the form of electrical square-wave pulses.

3. A brake control apparatus according to claim 2, in which said means responsive to said first signal comprises means triggered by the leading edges of said first signal to produce said second ouput signal in the form of electrical square-wave pulses.

4. A brake control apparatus according to claim 1, in which said means responsive to said first signal comprises means triggered recurrently by said first signal to produce said second signal in the form of square-wave pulses.

5. A brake control apparatus according to claim 4, in which said auxiliary means includes capacitor means, means responsive to said first signal to charge said capacitor means to a state dependent upon the rate of occurrence of said first-signal pulses, means for limiting the rate of change of said state of charge, means for supplying said second signal having its pulse-width dependent on said state of charge, and means for supplying said brake release signal in dependence upon different in pulse width between said first and second signals.

6. A brake control apparatus according to claim 1, in which said auxiliary means includes adjustable means for variably defining said deceleration limit.

7. A brake control apparatus according to claim 5, in which said adjustable means is sensitive to deceleration of the vehicle to define said deceleration limit in accordance with said vehicle deceleration.

8. A brake control apparatus for a vehicle comprising
    a generator for producing electrical pulses at a rate proportional to the angular velocity of a braked wheel;
    circuit means for producing square wave output pulses directly in response to said electrical pulses, including means for monitoring the rate of occurrence of the electrical pulses to control the width of the output pulses in dependence thereon, and auxiliary circuit means arranged to adjust the width of said output pulses independently of the rate of occurrence of said electrical pulses whenever a rate of change of the rate of occurrence of said electrical pulses, in a sense indicating deceleration of the vehicle, exceeds a predetermined rate;

and means sensitive to a time sequence of the occurrence of the trailing edges of the electrical pulses relative to the trailing edges of the output pulses to produce a brake release signal.

9. A brake control apparatus according to claim 8, in which the auxiliary circuit means includes capacitor means arranged to have a state of charge dependent upon the rate of occurrence of said electrical pulses, the state of charge being arranged to control the width of said output pulses, and including means for limiting the rate at which said state of charge of said capacitor means can change.

10. A brake control apparatus for a vehicle, comprising:
a generator for producing a first signal at a frequency which is proportional to the angular velocity of a braked wheel of the vehicle;
circuit means to be triggered by successive cycles of said first signal to produce a second signal in the form of square-wave pulses having a frequency directly dependent upon the frequency of said first signal and including means for monitoring the frequency of said first signal to control the width of said second signal pulses in accordance therewith;
auxiliary circuit means arranged to adjust the width of said second signal pulses independently of the frequency of said first signal whenever a rate of change, in a sense indicating deceleration of the vehicle, of the frequency of the first signal exceeds a predetermined rate;
and means responsive to the condition that said second signal is being adjusted by said auxiliary circuit means to produce a brake release signal.

11. A brake control apparatus according to claim 10, in which said auxiliary circuit means includes means for adjusting said predetermined rate of change of the frequency of said first signal at which said second signal is adjusted by said auxiliary circuit means.

12. A brake control apparatus according to claim 11, in which said means for adjusting said predetermined rate is arranged to be sensitive to the rate of change of speed of the vehicle for adjusting the predetermined rate in accordance with the rate of change of speed of the vehicle.

13. Brake control apparatus for a vehicle, comprising in combination:
first means for providing a first electrical pulse signal having a frequency proportional to the angular velocity of a braked wheel of the vehicle;
second means governed by said first means for providing, normally in a predetermined phase relationship to said first pulse signal, a second electrical pulse-waveform signal having a frequency that decreases with decrease in the frequency of said first signal, said second means prohibiting a rate of change change in the pulse-width of said second signal in excess of a defined value when said change is in a sense corresponding to second-signal frequency decrease;
and comparator means responsive to any instantaneous change of phase between said first and second signals applied thereto for controlling at least in part the application of braking to the vehicle.

14. A brake control apparatus for a vehicle comprising:
a signal generator for producing an electrical signal having a frequency proportional to the angular velocity of a braked wheel;
first pulse generating means responsive to said electrical signal to provide first electrical pulses having a repetition frequency proportional to the frequency of said electrical signal and a pulse width dependent upon the frequency of said electrical signal;
means responsive to said first pulses to provide a unidirectional signal having an amplitude that varies in accordance with the repetition frequency;
deceleration responsive means to derive an output signal that varies in accordance with the said unidirectional signal, including means responsive to vehicle deceleration in excess of a predetermined rate to cause said output signal to lag the unidirectional signal, the degree of lag being proportional to the extent by which the deceleration exceeds the said predetermined rate;
second pulse generating means responsive to said first pulses to provide corresponding second electrical pulses having a repetition frequency equal to that of the said first pulses, the second pulse generating means including means responsive to said output signal to vary the width of the second pulses in a predetermined sense relative to respective ones of the first pulses when the deceleration is in excess of said predetermined rate;
pulse sensing means responsive to said first and second pulses to sense a said predetermined variation in the width of the second pulses and to provide a brake relief signal in response thereto; and
control means for responding to the said brake relief signal to provide a brake control signal for relieving the braking on the braked wheel.

* * * * *